INVENTORS
ROBERT W. BLOSSER &
GORDON L. RICHARD

United States Patent Office 3,817,849
Patented June 18, 1974

3,817,849
METHOD FOR REDUCING EMBRITTLEMENT CONDITION OF METAL
Robert W. Blosser, 305 E. Ridgewood Drive 73110, and Gordon L. Richard, 1400 Brookdale Drive 73115, both of Oklahoma City, Okla.
Continuation-in-part of application Ser. No. 844,579, July 24, 1969. This application Oct. 29, 1970, Ser. No. 85,023
Int. Cl. B01j 1/10
U.S. Cl. 204—157.1    11 Claims

ABSTRACT OF THE DISCLOSURE

An improved method for reducing the condition of embrittlement in a metal specimen with both heat and a neutron flux of selected density. The method consists of placing a metal speciman, in heated environs and in view of neutron radiation for a predetermined period of time in order to alleviate any embrittlement condition and/or to reduce likelihood of such condition at a later time, such heat/neutron irradiation tending to rearrange the interstitial makeup of the metal specimen, e.g. by bringing about dissociation of diatomic or molecular hydrogen to its monatomic state.

CROSS-REFERENCE TO CO-PENDING APPLICATION

The present application is a continuation-in-part of U.S. Patent Application Ser. No. 844,579 entitled "Method for Reducing Embrittlement Condition of Metals" as filed by the present inventors on July 24, 1969, as refiled as a continuation-in-part application on Apr. 19, 1972 under Ser. No. 245,643.

BACKGROUND OF THE INVENTION (1) Field of the invention

The invention relates generally to the treatment of metals for alleviation of weakening condition and, more particularly, but not by way of limitation, it relates to a method for combatting embrittlement condition of metals.

(2) Description of the prior art

The prior attempts at alleviation of metal embrittlement conditions have been largely confined to various types of heat treatment. That is, an approach wherein increased heat is applied to the metal specimen in an attempt to drive hydrogen out of its substance. Such removal of hydrogen was effected through dissociation and diffusion as a result of baking of the metal specimen for a predetermined time at a selected temperature, and such procedure was necessarily time consuming. The prior art heat treating or baking processes required baking of a specimen at the highest possible temperature, thereby to reduce the time required as mush as possible, but various temperature limitations were to be observed in order not to damage prior instilled desirable heat treatment properties. Aside from the prior types of heat application processes, the only other avenues appear to be various attempts at complete avoidance of the hydrogen or other embrittlement condition in the first place. This may cause severe limitation in availability of treating processes, or it may necessitate an initial barrier coating deposition.

SUMMARY OF THE INVENTION

The present invention contemplates a method of treating metals to remove embrittlement conditions in much reduced times. In a more limited aspect, the invention consists of irradiating a metal specimen in a neutron flux of predetermined density for a short time at elevated temperature in order to remove or alter the atomic structure of the embrittlement-causing hydrogen from the substance of the metal specimen.

Therefore, it is an object of the present invention to provide an improved method for reducing probability of embrittlement failure of a metal more quickly than has been possible in prior known processing systems.

It is also an object of the invention to provide an embrittlement combatting method of more rapid execution which is capable of reducing production costs surrounding manufacture, maintenance or re-conditioning of selected metal objects.

Finally, it is an object of the present invention to provide a method for the alleviation of hydrogen embrittlement in non-destructive manner utilizing heat and neutron radiation capable of permeating the physical structure of the metal to remove or alter embrittlement-causing molecules and/or ions.

Other objects and advantages of the invention will be evident from the following detailed description when read in conjunction with the accompanying drawing which illustrates the invention.

DETAILED DESCRIPTION OF THE PREFERRED EMBODIMENT

Figure 1:
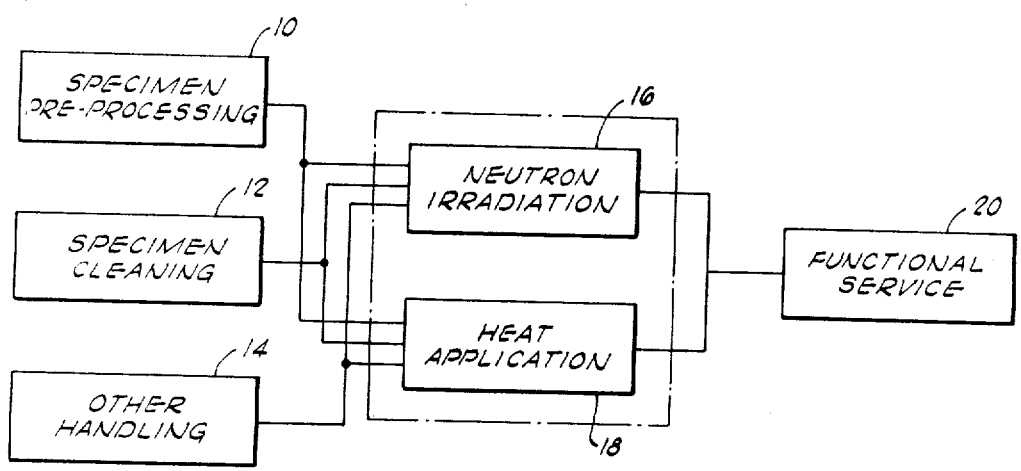
FIG. 1 is a functional diagram illustrating various steps in the method of the invention.

The condition of embrittlement of metals, particularly hydrogen embrittlement in high performance, high reliability metal structures, has today become a problem of some magnitude in certain areas of industry and technology. The condition of embrittlement is one, which highly increases the probability of stress failure in metal structures, but which is quite difficult of detection prior to the actual failure, i.e. cracking, flaking or such of the metal structure. Such a condition becomes a particular hazard in any industry or endeavor wherein high reliability must be imposed upon metals making up essential structures, e.g. aircraft industry, pipeline industry, the shipping and building industries, to name only a few specific areas. Treatment with prior means generally consisting of high heat treating may be so time consuming as to be prohibitive in many applications. Further hydrogen removal from such as titanium is impractical since it requires vacuum annealing at extremely high temperatures.

It is now known that certain treatment processes serve to hasten or bring about embrittlement conditions such that some form of embrittlement alleviating treatment is necessary in order to enable the initial metal processes. Thus, for example, hydrogen may be introduced during melting and entrapped during solidification of metals, or it may be picked up during heat treatment, electroplating, acid picking, welding, and other processes as performed on metal specimens. Some form of embrittlement alleviating process becomes a necessity as a followup to certain of the above treaments, especially as employed in the fabrication or reconditioning of high reliability metal structures. The present invention, as will be further described, is capable of rapid treatment to alleviate the embrittlement condition with minimal increase in production time costs, etc.

A commonly held concept of hydrogen embrittlement is that monatomic hydrogen precipitates at internal voids as molecular or diatomic hydrogen. Such voids may be true voids, microcracks, or they may simply be regions of high dislocation density. While the above is merely a basic idea of hydrogen embrittlement, it should be understood that there are many more facets of the phenomena to be considered in gaining complete information as to the stress and fracture occurrences; however, the basic physical characteristics of the phenomena are ascertained to a sufficient extent to support a more or less general definition of the present method. While all of the nuclear and interstitial events of the process would be difficult of explanation, the basic interaction of matter may be set forth in well-known terms and relationships.

A severe embrittlement condition can be produced in various metals by the presence of but very small amounts of hydrogen. Finding support is the fact that those metal structures of the body-centered cubic type and the hexagonal close structured types are the most susceptible to hydrogen embrittlement. As little as .0001 weight percent of hydrogen can cause cracking or, at least, great reduction in ductility of steel. Hydrogen, being a small atom, is present in solution as monatomic hydrogen, and is capable of diffusing voids and interstitials of a metal structure very rapidly, especially at increased temperatures. The most commonly held concept is that the monatomic hydrogen precipitates at the internal void positions as molecular or diatomic hydrogen to bring about the hydrogen embrittlement. Thus, when critical hydrogen concentration is obtained, a crack or weak point of the metal arises. Such embrittlement condition may show up as either cracks or flakes of the metal, depending upon the basic physical structure of the metal itself at the point of embrittlement.

It appears that all ferritic steel may be subject to hydrogen embrittlement to some degree, and, generally, the variations in degree can be correlated to the composition and micro-structure of the particular steel. In addition, various other metals and metal alloys may be subject to diffusive hydrogen action and embrittlement in varying degrees, and embrittlement alleviation will often be desirable relative to many metal working operations. The hydrogen embrittlement may be found in such as iron, iron alloys, copper, aluminum, titanium, and still other metals and alloys of metals too numerous to itemize.

In accordance with the present invention, a metal specimen can be irradiated with a suitable intensity of neutron flux at elevated temperatures to remove or greatly reduce the damaging hydrogen content of the specimen more rapidly, and this irradiation will nto appreciably alter any other mechanical or physical properties of the metal specimen. Thus, as shown in FIG. 1, metal structure having a possible embrittlement condition may be derived from any of a specimen pre-processing 10, specimen cleaning 12, or other specimen handling stage 14 for introduction through a neutron irradiation step 16 coupled with a heating step 18. After heating and neutron irradiation of sufficient time and intensity, as determined in accordance with the size and shape of the specimen and other statistics pertaining to severity of embrittlement, this specimen can then be passed on or replaced in functional service step 20.

To take merely one example, for purposes of illustration, an aircraft landing gear component may be passed through speciman cleaning 12 which includes paint removal through chemical means, plating removal through electrolytic means, picking and replating, any of such processes being known contributors to the embrittlement condition; and, thereafter, the metal part is passed through the heat application step 18 and the neutron irradiation step 16 for a pre-determined time before return to functional service step 20, i.e. reassembly into the particular landing gear structure.

The neutron has special properties which make it particularly suitable for such irradiation usage. The neutron has essentially the same mass as a proton but it has no electric charge, and this precludes acceleration or deflection by electric or magnetic fields as well as inhibition by such as a coulomb barrier. Thus, even the very slow neutrons can move about within electron shells of atoms since they have but very small interaction with electrons present therein.

Due to the operation of the above properties, the tightest structure of matter, in this instance, metal solids, is quite open to the neutron. Even the more crystalline solids with densely packed and tightly bound atoms are quite easily penetrated to relatively great depths by the neutron. When a neutron passes through matter such as this, it interacts with native nuclei of the matter in one of two dominant manners; that is, neutron radiative capture $(n, \gamma)$ or elastic collisions between the neutron and the nuclei of the matter. For most structural metals with which the process is concerned, the radiative capture crosssection is so small that the primary interaction can be relied upon as that of the neutrons interacting with the nuclei of the matter.

In such elastic collisons, the greatest transfer of kinetic energy from one to the other particle occurs when the two particles have equal masses. Therefore, since protons and neutrons have nearly equal masses, the neutron can transfer a large percentage of energy to the proton upon collision. In contrast to this, a neutron upon colliding with a heavy nucleus such as that of most structural metals can transfer only a very small percentage of its energy to the heavy nucleus. The neutron will then rebound from such a collision, retaining most of its original kinetic energy, then to proceed along a new path until another collision occurs. Such a process may recur repeatedly before the neutron loses a significant portion of its initial kinetic energy.

When hydrogen is present within the interstitial spaces of the specimen matter, collisons between a bombarding neutron and a hydrogen nucleus (proton) are possible. Such collisions can supply the necessary energy which is required to separate diatomic hydrogen into two free protons, while also imparting significant kinetic energy to these protons. For diatomic hydrogen, the dissociation energy is equal to 4.48 electron volts. The binding energy of an electron and a proton forming a hydrogen atom has been shown experimentally to be equal to 13.58 electron volts. Thus, the binding energy, and the dissociation energy (the total energy required to separate diatomic hydrogen into two free protons or hydrogen nuclei) is equal to 18.06 electron volts.

Elastic collisions between a bombarding neutron and a hydrogen nucleus or proton can provide the necessary 18.06 electron volts which are required to separate the diatomic hydrogen into two free protons. Thus, when a neutron flux impinges upon a solid, such as a selected metallic specimen, the majority of the neutrons will enter the metal specimen and progress through the solid such that their net displacement is away from the neutron source. Hydrogen atoms which are entrapped within the solid will experience neutron collisions, and in those collisions wherein the energy transfer is high enough, the atoms will be ionized and caused to move in the general direction of the neutron flux.

A continuation of the irradiation for a sufficient period of time will cause most of the hydrogen in a metal specimen to migrate out of the solid along the direction of the neutron flux radiation. The time required to reach a desired degree of freedom from the hydrogen will depend upon the flux density and energy spectrum. It will also depend upon the physical properties of the metal speciment for which the hydrogen is being removed. The quantity of hydrogen $Q_t$ remaining in a given item after a process time $t$ will take the following form $$Q_t = Q_o e^{-kt}$$

wherein the constant $k$ is determined by the neutron flux density and energy spectrum as considered with the mechanical and physical properties of the particular metal specimen, and $Q_o$ is equal to the original quantity of hydrogen present in the specimen.

The additional heating of the specimen tends to shorten the required time of neutron irradiation by an amount equatable to degree of heat application and its effect. Thus, the specimen can be heated to easily attainable uniform heats such that the time of neutron irradiation is considerably shortened to achieve comparable relief from the embrittlement condition. Without reciting specific heat requirements, it is sufficient to say that some easily generated and applied heat radiation is employed without the necessity for prolonged application of heat at extremely high and difficulty managed temperatures.

Figure 2:
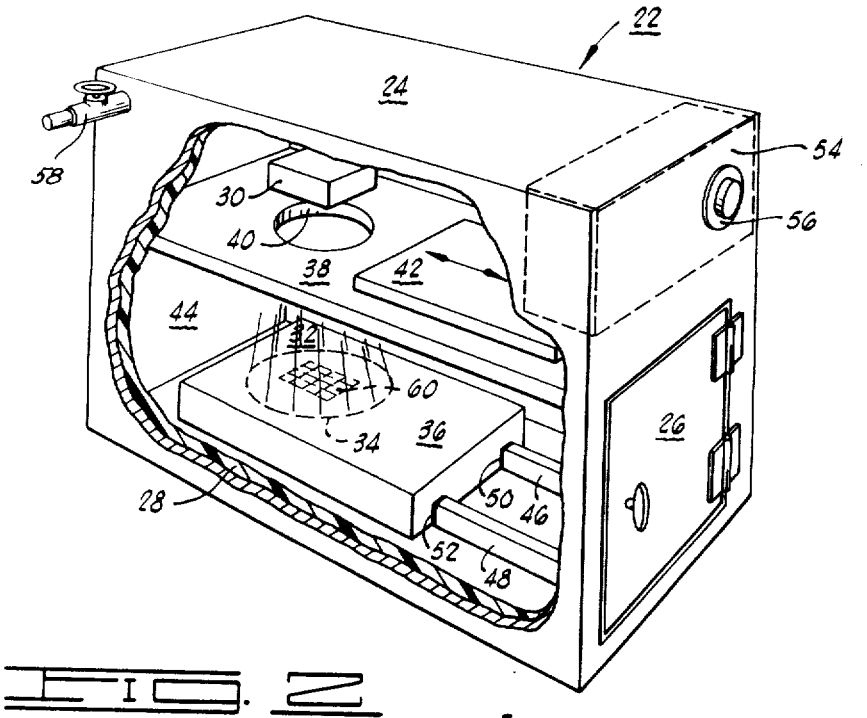
FIG. 2 is a perspective view, with parts shown in cutaway, of one form of apparatus which is suitable for carrying out the method of the invention.

The method of the invention may be carried out in such as an apparatus 22 which is shown in FIG. 2. The apparatus 22 may consist of any suitable enclosure such as rectangular enclosure 24 preferably having an access or door 26 provided therein. Enclosure 24 may be formed from a rigid structural material which is internally lined by a suitable neutron absorptive shielding layer 28, e.g. polyethylene or other shielding material which exhibits the desired impervious quality to neutro radiation. It is also desirable to include a suitable form of heat modulation within such shielding layer 28.

A neutron source 30 may be positioned with enclosure 24 in position to emit radiation 32 for continuous coverage over an area 34 on a supporting base 36. A shielding panel 38, e.g. a polyethylene or other neutron absorptive slab may be supported across the closure 24 to define an aperture 40 through which radiation 32 from source 30 is directed towards area 34. A sliding shutter 40, also constructed of neutron absorptive material, is positioned for manipulation to closure up aperture 30 during times when a metal specimen is being changed, turned, or otherwise moved in a lower irradiation chamber 44.

The supporting base 36 may be any suitable structure upon which the metal specimen may be rested or otherwise secured, and such base 36 may be made slidable for access through door 26, e.g. slidable along such as a pair of rails 46 and 48 in coaction with slide ways or grooves 50 and 52, respectively. It should be understood that the irradiation chamber 44 may include any of various mechanisms which facilitate insertion and removal, as well as periodic turning or moving, of the metal specimen prior to or during the irradiation periods. It may also contain a hydrogen free purge gas such as nitrogen. The general size and shape of the specimen undergoing irradiation will bear greatly upon the size and type of facility employed as the shielded neutron irradiation enclosure and its supporting members.

A suitable form of heating unit 54 may be mounted as shown within the upper reaches of enclosure 24, and external control knob 56 provides adjustment control. The heating unit 54 may be selected from any of various available and generally employed forms, e.g. electrical heaters, fluid heaters, radiant energy heaters, etc. In the case of radiant energy heaters, it may also be desirable to employ certain optimally located reflectors over or adjacent to the radiation area 34. An entry valve 58 is secured through enclosure 24 in communication with the interior of enclosure 24 and chamber 44. Valve 58 may be used for controlled application of a suitable purge gas, or it may serve as a check valve for evacuating all gaseous components to ensure a (near) vacuum interior.

An electrostatic field may be employed to preclude re-adsorption of hydrogen ions (protons) which have been driven out of the metal specimen, and hydrogen ions which have been generated due to the neutron flux acting upon any hydrogen which may be present in the atmosphere surrounding the specimen. Thus, a suitable insulated grid 60 may be overlaid or formed integrally within base 36 at area 34 for charging at pre-set potential. The electrostatic field may be produced by charging the specimen to a high positive potential relative to the enclosure or to a suitable cathode within the enclosure.

The neutron source 28 may be any of various commercially available neutron sources which emit the desired density of radiation for the particular application. For low intensity usage, it may be sufficient to employ a well-known form of radium-beryllium, americium-beryllium, etc. source. For still other applications requiring very high energy neutrons on the order of 2 bev., or other high energy source of commercially available type. Still other sources are available such as photo-disintegration reaction, nuclear reactions through accelerated charged particle collisions, a deuteron stripping reaction, etc.

The foregoing discloses a novel method for eliminating or alleviating the condition of embrittlement in certain metals. In particular, the method succeeds in enabling a still more rapid reduction of embrittling hydrogen presence within the structure of metal specimens. Such a combination heat and neutron irradiation methods as disclosed herein offers a more economical process wherein hydrogen embrittlement caused by metal treating conditions or processes can be eliminated or significantly reduced to an acceptable level.

Changes may be made in the combination and arrangement of steps as heretofore set forth in the specification and shown in the drawing; it being understood that changes may be made in the embodiments disclosed without departing from the spirit and scope of the invention.

What is claimed is:

1. A method for reducing hydrogen embrittlement condition of an embrittled metal specimen, comprising the combined steps of:
   heating the metal specimen to a pre-determined elevated temperature greater than ambient temperature; and
   irradiating the metal specimen with neutrons thereby reducing the condition of embrittlement.

2. A method of claim 1 which is further characterized in that:
   said combined neutron and heat irradiation increases the ratio of monatomic hydrogen atoms to diatomic hydrogen molecules causing migration of the monatomic hydrogen atoms out of the metal.

3. The method of claim 1 wherein said metal is iron.

4. The method of claim 1 wherein said metal is a carbon-iron material.

5. The method of claim 1 wherein said metal is copper.

6. A method as set forth in claim 1 wherein the metal is aluminum.

7. The method of claim 1 wherein the metal is an alloy of iron or aluminum.

8. The method of claim 1 wherein the metal is titanium.

9. The method of claim 1 which is further characterized in that:
   said step of irradition is effected by positioning the metal for impingement and permeation of neutrons within a neutron flux.

10. The method as set forth in claim 9 which is further characterized in that:
    said neutron flux is generated within a heated shielding enclosure which is impervious to neutrons and head insulated to maintain the enclosure uniformly at said pre-determined elevated temperature.

11. The method claim 1 which is further characterized in that:
    said metal specimen is charged to a positive potential, producing an electrostatic field about the metal for accelerating hydrogen ions away from the metal.

References Cited
UNITED STATES PATENTS

| | | | |
|---|---|---|---|
| 3,214,359 | 10/1965 | Stout et al. | 204—157.1 H |
| 3,310,395 | 3/1967 | Swartz et al. | 148—133 |
| 3,440,037 | 4/1969 | Martin et al. | 75—128 |
| 3,496,034 | 2/1970 | Alger et al. | 148—36 |

HOWARD S. WILLIAMS, Primary Examiner